United States Patent [19]

Morishita

[11] 4,014,422
[45] Mar. 29, 1977

[54] REEL MECHANISM
[75] Inventor: Yasomatsu Morishita, Kure, Japan
[73] Assignee: Ryobi, Ltd., Fuchu, Japan
[22] Filed: Nov. 7, 1975
[21] Appl. No.: 629,829
[30] Foreign Application Priority Data
Nov. 7, 1974 Japan .................. 49-135401[U]
Nov. 7, 1974 Japan .................. 49-135402[U]
[52] U.S. Cl. .................... 192/67 R; 192/48.5; 192/89 A; 192/93 A; 242/212
[51] Int. Cl.² ............... F16D 11/10; A01K 89/015
[58] Field of Search ............ 192/48.5, 67 R, 89 A, 192/93 A; 242/212

[56] References Cited
UNITED STATES PATENTS

| | | | |
|---|---|---|---|
| 2,076,097 | 4/1937 | Schafer | 242/212 |
| 2,129,386 | 9/1938 | Schafer | 192/89 A X |
| 2,492,819 | 12/1949 | Schulz | 192/93 A X |
| 2,573,240 | 10/1951 | Berlinger | 242/212 X |
| 2,859,924 | 11/1958 | Sarah | 242/212 X |
| 3,226,052 | 12/1965 | King | 242/212 X |

*Primary Examiner*—Allan D. Herrmann
*Attorney, Agent, or Firm*—Sughrue, Rothwell, Mion, Zinn & Macpeak

[57] ABSTRACT

A reel mechanism includes a pinion engaged with a main toothed wheel that is rotated by a handle. The pinion is selectively engaged to a main rod for joint locking rotation thereof. A spool is fixed to the main rod. The reel mechanism further includes a clutch lever, a clutch cam, and a switching lever. The clutch lever is engaged with the pinion in such a manner that the pinion can rotate relative to the lever but both are locked together axially. The clutch cam is rotatably mounted to the housing and has cam surfaces which axially move the switching lever and the pinion when the cam rotates. The cam surfaces have a displacement larger than the height of that part of the pinion which engages the main rod.

6 Claims, 7 Drawing Figures

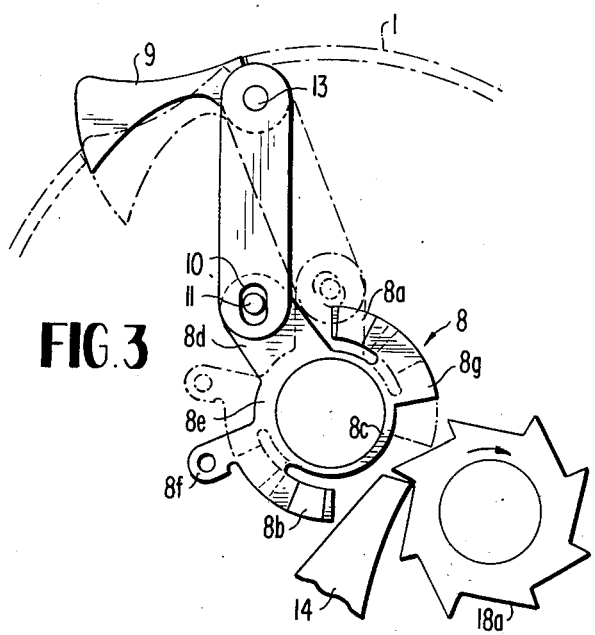
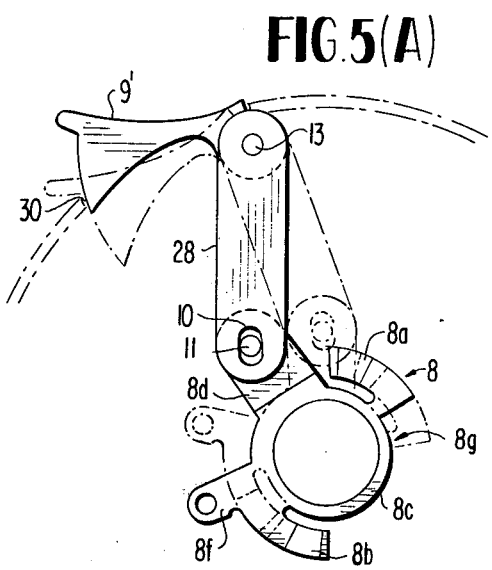
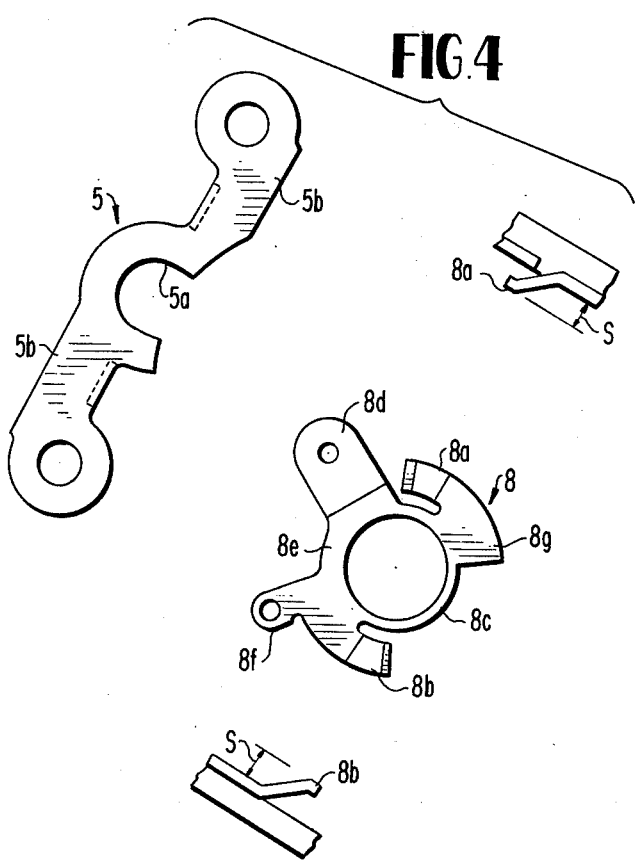
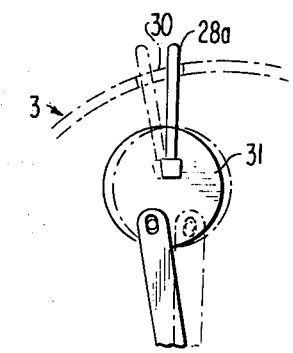
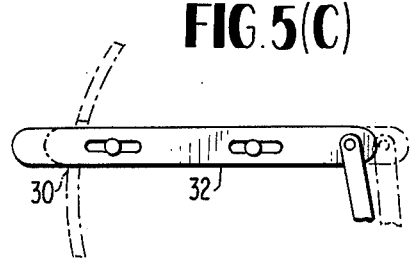

REEL MECHANISM

BACKGROUND OF THE INVENTION

This invention relates to a fishing reel mechanism and, more particularly to a clutch for connecting and disconnecting rotating motion between a handle and a spool.

It is an object of this invention to provide for fishing reels a novel clutch, having a cam and a lever, for connecting and disconnecting rotating motion between a handle and a spool.

Another object of this invention is to provide a novel clutch capable of automatically switching from a rotating motion disconnecting state to a rotating motion connecting state only by rotating a handle.

A further object of this invention is to provide a novel clutch, including a clutch lever and a clutch cam, which is especially simple in construction and is easy and inexpensive to produce.

A still further object of this invention is to provide a novel clutch which is durable for prolonged periods.

These objects are attained by a clutch mechanism which includes a clutch lever and a clutch cam for smoothly connecting and disconnecting the rotating motion from a handle to a spool and which can switch into a connecting state by rotating the handle clockwise or pushing a switching lever upwardly.

BRIEF DESCRIPTION OF THE DRAWINGS

FIG. 3 is a top plan view showing the relation between a switching lever, a clutch cam, and a ratchet;

FIG. 4 is an elevational view of a clutch lever and a clutch cam which is shown partially in section; and FIGS. 5(a), 5(b), and 5(c) show other embodiments of this invention.

DESCRIPTION OF THE PREFERRED EMBODIMENT

Figure 1:
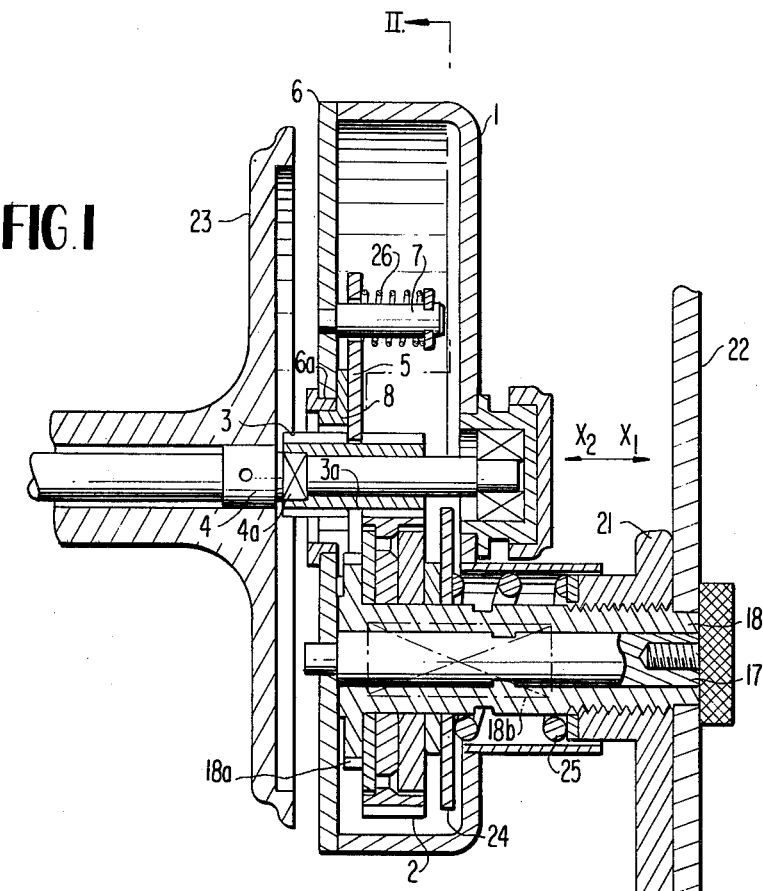
FIG. 1 is a fragmentary vertical sectional view of a preferred embodiment of a reel mechanism in accordance with this invention.
Figure 2:
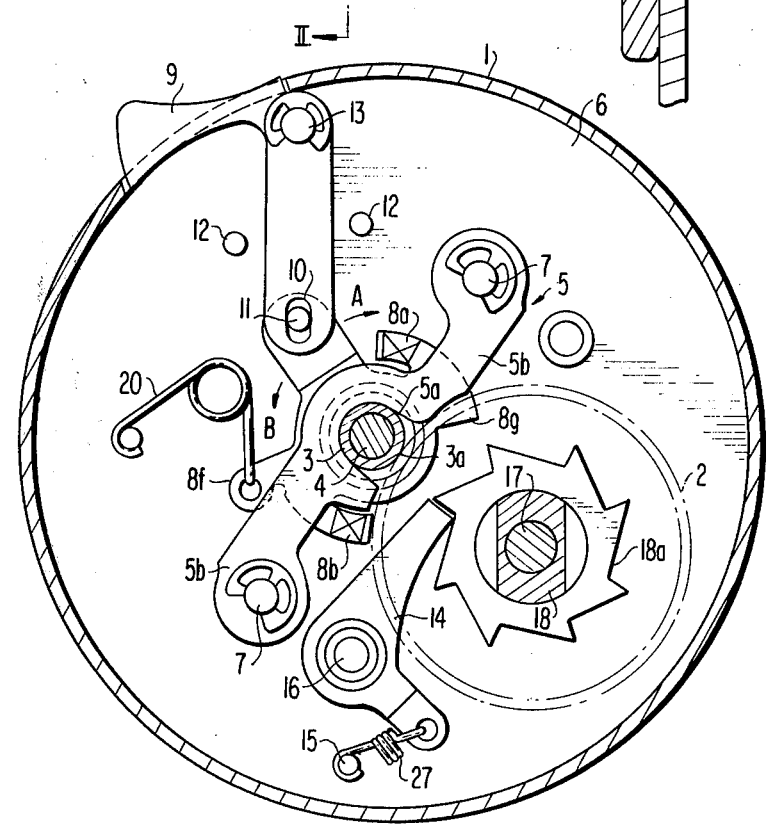
FIG. 2 is a sectional view taken along the lines II—II of FIG. 1.

Referring now to the drawings, and initially to FIGS. 1 and 2, there is shown a reel mechanism according to this invention which includes simple frictional clutch means for connecting and disconnecting transmission of rotating forces. The frictional clutch means comprises a main toothed wheel 2 which is free to rotate about a hollow ratchet shaft 18a. The hollow shaft 18 is provided at its inner end with a ratchet 18a and at the other end with a threaded portion engaged with a drag handle 21. Inserted in the hollow ratchet shaft 18 is a shaft 17 having its inner end supported by the housing base 6. A washer 24 is provided in contact with the inner face of the main toothed wheel 2 for the purpose described hereinafter.

The hollow ratchet shaft 18 has in its outer periphery a portion 18b chamfered (e.g., beveled) up to the washer 24 so that the hollow shaft 18 and the washer 24 can be coaxially rotated. A compressed spring member 25 is positioned between the washer 24 and the drag handle 21 for urging the washer 24 towards the main toothed wheel 2 so as to produce frictional forces therebetween thereby to transmit the rotating motion from the handle 22 to the main toothed wheel 2. The frictional force can be adjusted by screwing the drag handle 21 into or out of the hollow shaft 18. This prevents the line from being broken by overtension.

Engaged with the ratchet 18a is pawl 14 for preventing reversal of motion of the shaft 18. The pawl 14 is pivotably mounted to a pin 16 secured to the base 6, and has one end thereof connected to a spring member 27, which is also connected to a pin 15 on the base 6.

A main rod 4 is provided above the main toothed wheel 2 and supported in the housing by bearings for rotatably supporting a spool 23. A pinion 3 which is engaged with the main toothed wheel 2 is mounted on the main rod 4 for sliding movement along the main rod 4. When the pinion 3 slides towards the spool 23 so as to be coupled to the main rod 4 through a chamfered portion 4a thereof, the rotating motion of the main toothed wheel 2 can be transmitted through the main rod 4 to the spool 23. On the other hand, when the pinion 3 slides away from the spool 23, the connection is released between the chamfered portion 4a and the main rod 4 so as to stop transmitting the rotating motion. The chamfered portion provides suitable engagement between the pinion 3 and the rod 4 so that when engaged, the two elements rotate together.

The clutch of this invention includes a clutch lever 5, a clutch cam 8, and an switching lever 9 for connecting and disconnecting the transmission of the rotating motion between the handle 22 and spool 23.

As illustrated in FIGS. 1 through 4, the clutch lever 5 includes a portion 5a formed substantially in a semi-circle shape for engagement with an annular grooved portion 3a of the pinion 3. Extending from the portion 5a in opposite directions are arms 5b, each of which has its end portion slidably held by a lever pin 7 secured to the base 6. A spring member 26 is provided on the lever pin 7 for urging the arms 5b towards the base 6. Since pinion 3 is slidable to and from the base 6, and since portion 5a engages groove 3a, , the pinion is held in a position towards base 6. This is the engaged position. The clutch cam 8 comprises a cylindrical portion 8c having its inner diameter larger than the outer diameter of the pinion 3, a flange 8e provided at the outer periphery of the cylindrical portion 8c, and cams 8a and 8b extending from the flange 8e in the same periphery and being inclined upwardly in the same direction as the flange 8e rotates. The cams 8a and 8b are formed so that their height is larger than that of the chamfered portion 4a of the main rod 4. Additionally, a pawl 8g is provided in the opposite position of the cam 8a and in the same periphery as the cam 8a. As illustrated in FIG. 1, the clutch cam 8 has its cylindrical portion 8c engaged through a bushing with the opening 6a of the base 6 so as to be positioned between the base 6 and the clutch lever 5 for free rotation about the pinion 3. Also, the clutch cam 8 has its arm 8d connected to the switching lever 9 by a lever pin 11.

Furthermore, the clutch cam 8 has its arm 8f extending from the flange 8e and loaded by a spring member 20 for urging the clutch cam 8 in the direction of the arrow B as shown in FIG. 2. When the clutch cam 8 is in the position illustrated in FIG. 2, the arms 5b of the clutch lever 5 lay upon the flange 8e and the clutch lever 5 is urged by a spring member 26 towards the base 6 so that the pinion 3 is connected to the chamfered portion 4a of the main rod 4, whereby the rotating motion of the handle 22 can be transmitted to the spool 23. The pawl 8g of the clutch cam 8 is positioned so that its locus intersects that of the ratchet 18a, and is engaged with the ratchet 18a when the clutch cam is rotated in the direction of the arrow A as illustrated in the dotted lines. In FIG. 2, reference numerals 12 indicate stopper pins.

The operation of the clutch of this invention will be understood by the following description with reference to FIGS. 1 through 3. The pinion 3 is connected through the chamfered portion 4a to the main rod in the position illustrated by the solid lines in FIGS. 1 through 3, so that the rotating motion of the handle 22 can be transmitted to the spool 23 and the fishing line can be wound up by the spool 23. When the switching lever 9 is pushed and rotated about the pin 13 to the position illustrated by the broken line in FIG. 3, the clutch cam 8 is rotated in the direction A against the force of spring 20 to the position shown by the dotted line in FIG. 3. As the clutch cam 8 rotates, the cam surfaces 8a and 8b urge the clutch lever away from the base 6 against the force of springs 26. The width of each of the arms 5b is properly determined in accordance with the rotating displacement of the clutch cam 8 so that the cam surfaces 8a and 8b push against arms 5b at the final rotated position of cam 8. As the clutch lever 5 is pushed against the spring load of the spring member 26 by the height of the cams 8a and 8b, the pinion 3 is moved in the direction of the arrow $X_1$ so that the pinion 3 is disengaged from the chamfered portion 4a of the main rod 4, to permit free rotation of rod 4 and spool 23 about the axis, and the transmission of the rotating motion is disconnected between the handle 22 and the spool 23. It will be appreciated that the spring 20 gives the mechanism a bistable character. Thus when lever 9 is in the engagement position (i.e., as shown by the solid line in FIG. 3), the spring exerts a force in the direction of the arrow B in FIG. 2. When the lever 9 is in the disengagement position, (e.g., as shown by the phantom lines in FIG. 3) the spring exerts a force in the direction of the arrow A in FIG. 2. It will be noted also that in the disengagement position of the mechanism, the pawl 8g (edge of cam 8) abuts ratchet 18a as shown by the phantom lines in FIG. 3.

In order to re-engage the pinion 3 to the chamfered portion 4a of the main rod 4, the handle is rotated clockwise causing ratchet 18a to push the pawl 8g to move the clutch cam 8 in the direction of the arrow B against the holding force of spring 20. The cam surfaces 8a and 8b are returned to the position illustrated in FIG. 2. The clutch lever 5 is returned to the engagement position, illustrated in FIG. 1, by the spring members 26, and the pinion 3 is moved towards the spool 23 by the rotation of the main toothed wheel, which is in helical gear engagement with the pinion 3, so that the pinion 3 is connected to the chamfered portion 4a of the main rod 4 thereby permitting the transmission of the rotating motion from the handle 22 to the spool 23 at once.

In accordance with this invention, the clutch includes the clutch cam 8 which is rotated to axially move the clutch lever 5 engaged with the grooved portion 3a of the pinion 3 for connecting and disconnecting the pinion 3 with the main rod 4 thereby permitting the rotational motion of the handle to be transmitted and not transmitted to the spool at respective switched positions of the cam. Further, the clutch cam 8 is preferably provided with the pawl 8g engaged with the ratchet 18a in a rotating motion disconnecting state which serves to rotates the clutch cam 8 to axially move the clutch lever 5 when a handle is rotated clockwise in the disconnecting state, thereby permitting the automatic and rapid switching back to the connecting state without the switching lever being operated. This is important particularly when it is desired to rapidly stop the unwinding of the line in the cases such as ground angling and the like.

As the alternative to the pawl 8g, the lever could be used to alter the mechanism from the disengaged state to the engaged state. However in that case it would be preferable to provide additional handle parts to facilitate the movement of the handle from the disengagement to the engagement positions. Such features are shown in FIGS. 5(A)–5(C).

FIG. 5(A) illustrates another embodiment wherein no pawl such as the pawl 8g shown in FIGS. 3 and 4 is used. Instead of the pawl 8g, the switching lever 9 is provided with a projection 9' for moving the lever axially thereby permitting the switching of the rotating motion from a disconnecting state to a connecting state or from a connecting state to a disconnecting state.

FIG. 5(B) shows a conventional eccentric cam 31 used in place of the switching lever illustrated in FIG. 5(A), and FIG. 5(C) shows a push rod 32 used for switching operation of the clutch which can attain the same efficiency as the switching lever.

What is claimed is:
1. In a reel mechanism, a clutch apparatus for selectively engaging and disengaging a pinion and a main rod in an axial direction, whereby said pinion and rod are locked to rotate simultaneously in the engaged position and are free to rotate separately when in the disengaged position, said reel mechanism being the type having a housing and handle for imparting rotation to said pinion via a main toothed wheel, said clutch apparatus comprising:
   a. spring biased clutch lever means for imparting axial motion to said pinion, said clutch lever means being engaged with said pinion to permit relative rotation therebetween and having paired arms extending radially from opposite sides of said pinion, said clutch lever means being connected to said housing to prevent rotational movement thereof and permit axial movement thereof,
   b. cam means, positioned in said housing, and having at least a cam surface acting on each arm of said clutch lever means, for imparting an axial force to said clutch lever means when said cam means is rotated from a first position to a second position in opposition to said bias, and
   c. switching lever means for rotating said cam means from said first position to said second position to force said clutch and said pinion to move axially whereby said pinion is disengaged from said rod.
2. The clutch apparatus as claimed in claim 1 wherein said cam means is disposed in said housing between said clutch lever and a wall of said housing, said clutch lever having a semi-circular portion embracing said pinion with said pair of arms radiating from said semi-circular portion, and said cam surfaces being inclined away from said wall at an angle and positioned with respect to said arms to force said arms to ride up on said cam surfaces as said cam means rotates from said first to said second position.
3. The clutch apparatus of claim 2 wherein said pinion has an annular groove portion thereof rotationally slidably engaged with the inner periphery of the circular portion of said clutch lever, the diameter of said inner periphery being smaller than the diameter of the external periphery of said pinion to axially lock said pinion to said lever.

4. The clutch apparatus of claim 3 wherein said pair of arms of said clutch lever are axially slidably held at their respective end portions by lever pins secured to said housing, and spring means on said lever pins for biasing said arms towards said wall of said housing.

5. The clutch apparatus as claimed in claim 4, wherein said cam means comprises a cylindrical portion having an inner diameter larger than the outer diameter of said pinion, a flange provided at the outer periphery of said cylindrical portion, and cam surfaces extending from the flange upwardly inclined in a single rotating direction.

6. The clutch apparatus as claimed in claim 5, wherein said cam means further comprises a pawl engagable with a ratchet rotating coaxially with the main toothed wheel when said cam means is in said second position, whereby the rotation of said ratchet against said pawl returns said cam means to said first position.

* * * * *